Sept. 9, 1969            J. C. SETECKA            3,465,894
PORTABLE FOOD SERVICE DEVICE FOR TABLES AND THE LIKE
Filed Feb. 15, 1968            2 Sheets-Sheet 1
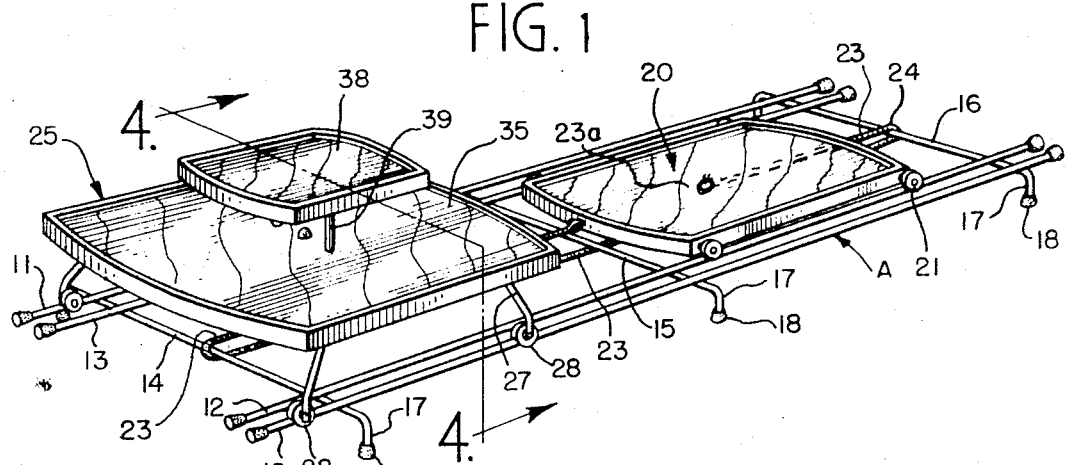
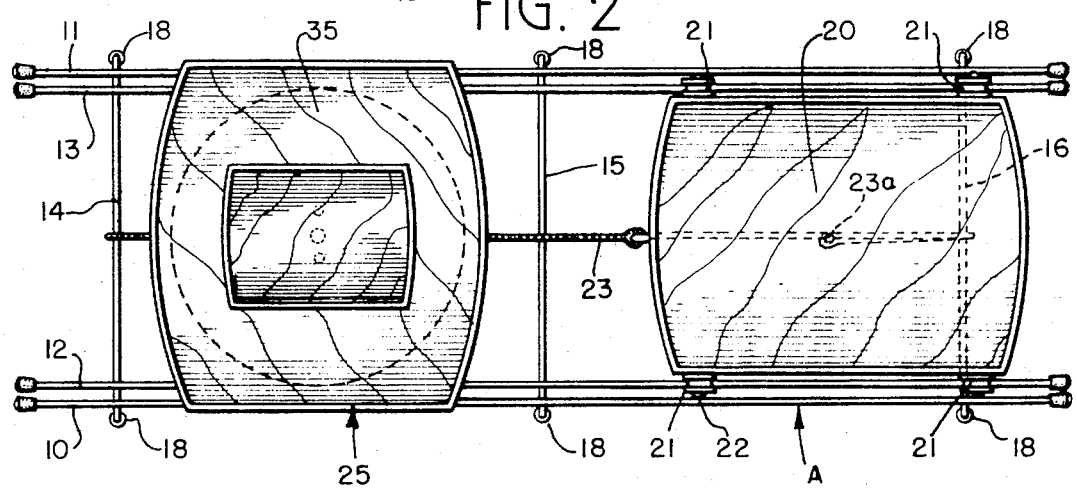
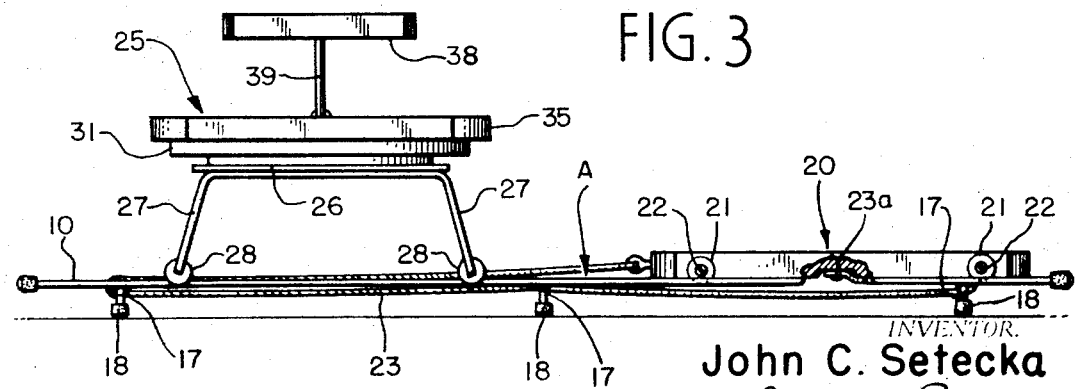
INVENTOR.
John C. Setecka
BY John F. Brezina
Attorney Sept. 9, 1969        J. C. SETECKA        3,465,894
PORTABLE FOOD SERVICE DEVICE FOR TABLES AND THE LIKE
Filed Feb. 15, 1968        2 Sheets-Sheet 2
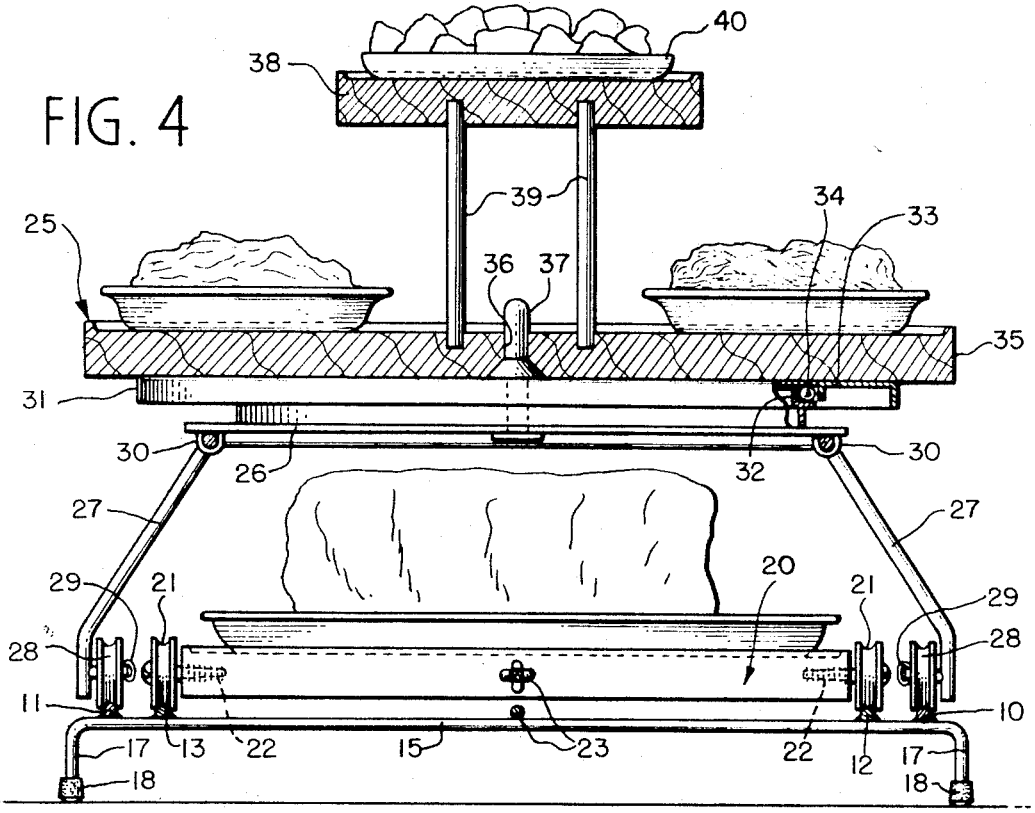
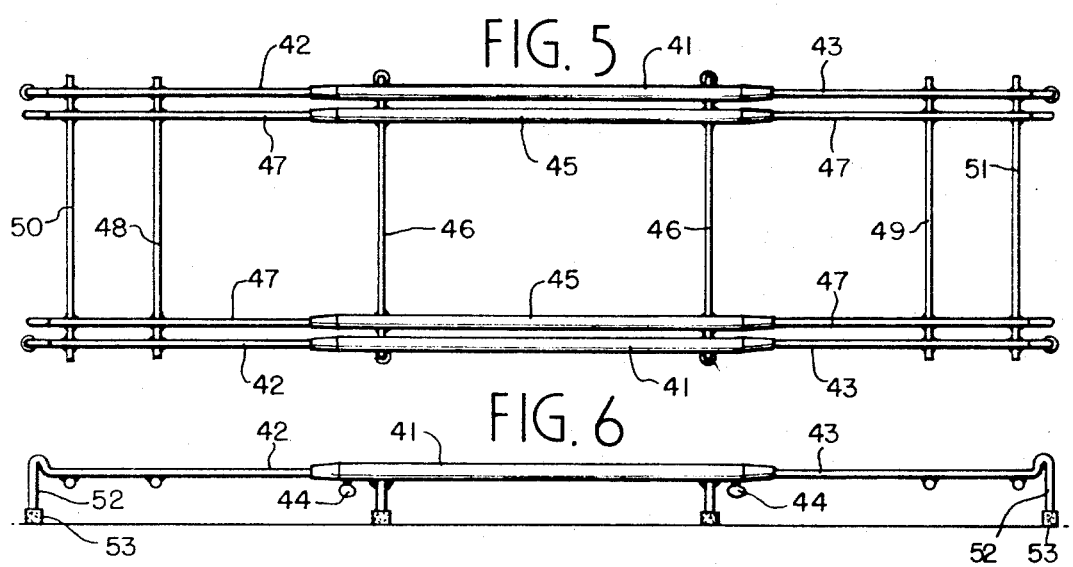
INVENTOR.
John C. Setecka
BY John F. Brezina
Attorney United States Patent Office 3,465,894
Patented Sept. 9, 1969

3,465,894
PORTABLE FOOD SERVICE DEVICE FOR
TABLES AND THE LIKE
John C. Setecka, 1931 S. Austin Ave.,
Cicero, Ill. 60650
Filed Feb. 15, 1968, Ser. No. 705,742
Int. Cl. A47f 3/14, 5/00; A47j 47/00
U.S. Cl. 211—129                                8 Claims

ABSTRACT OF THE DISCLOSURE

A portable adjustable apparatus or device, positionable on a serving table having a plurality of carriages or trays with rollers rollable on separate sets of longitudinal adjustable tracks or rails to provide for selective movement and positioning of food containing receptacles at varying locations relative to said tracks and relative to a supporting table.

---

This invention is directed to novel portable adjustable devices for rollably mounting two or more food supporting carriages or trays of different and varying heights upon and along elongated or large tables to permit persons to selectively move any of said carriages and trays to any desired position between the opposite ends or edges of a table to permit easy and quick serving of the foods supported thereon.

Objects of my invention are:

To provide rollably mounted trays or supports for movement in different planes and at different heights over and upon tables and removable track means for guiding and supporting such trays and supports to permit quick and easy positioning of various foods relative to said table.

To provide portable removable separate sets of rails positionable on tables and cooperating movable food supporting units of varying heights and sizes having rollers or pulleys journalled and connected to said units and having downwardly extending legs to maintain at least one of said units on separate tracks and above the other of said units, so that each of said food supporting units may be independently rolled to any desired position along said tracks and along a table for easy serving of any of the foods supported on said units, and without interfering with movement and positioning of the other of said food supporting units.

To provide means for rollably passing dishes of food to different locations convenient to different persons seated at a table, and thereby avoiding handling of hot and heavy dishes and receptacles; and to provide greatly increased support areas for various foods, and to provide rotatable food receptacle supports on said means to permit any person to rotate such supports to position the selected food into close positions for quick food removal.

To provide upper track guided rollable carriages which have one or more rotatable panel-like members on which a plurality of food receptacles may be supported and which can be rolled from one end of a table to the other without interfering with selected rolling guided movement of another lower food support and without contacting or tipping other relatively tall containers on the table; said carriages and lower food support being movable to a different room such as a kitchen for loading thereon of the desired foods and then being placeable on guide rails on the serving table for selected movement along said rails.

To provide sets of guide tracks or rails cooperable with the aforesaid supporting devices which are composed of two or more telescopic sections which can be collapsed, stored and packaged in compact form of substantially reduced size.

On the drawings:

FIG. 1 is a perspective view of food serving devices.

FIG. 2 is a top plan view thereof.

FIG. 3 is a side elevation of my portable serving device and illustrating the rollable food supports in different positions.

FIG. 4 is an end view of my serving device on an enlarged scale and showing rotatable food supporting devices mounted on the upper rollable carriage.

FIG. 5 is a top plan view of a modified embodiment of the track and guiding means composed of separable extensible telescopic rail sections.

FIG. 6 is a side elevation of the portable, adjustable and extensible guide track means illustrated in FIG. 5.

Letter A generally designates a substantially rectangular frame having a pair of outer parallel tracks or rails 10 and 11 preferably made of metal and each of which may be one continuous bar, tube or strip or composed of two or more tubes or pipes in telescopic relation to each other as hereinafter described. Numerals 12 and 13 designate a pair of spaced apart metal tracks or rails, each consisting of one or more bars, pipe or strips which are positioned spaced inwardly of and parallel to the track rails 10 and 11, as illustrated in the drawings.

A plurality of transverse or connecting cross bars, preferably three in number and designated by numerals 14, 15 and 16 respectively have their opposite end portions suitably secured, preferably by welding, to the outer rails 10 and 11 and to inner rails or tracks 12 or 13 at the respective points of intersection thereof so that a substantially rectangular frame A is provided.

The opposite ends of each of the connecting cross bars 14, 15 and 16 carry angularly extending legs 17 which are preferably integral and on which suitable rubber-like pads or caps 18 are mounted to prevent scratching or other damage to a table or support on which the serving devices are mounted. The opposite end portions of the said tracks or rails preferably extend beyond the endmost cross bars 14 and 16 respectively, as illustrated.

Numeral 20 designates a lower disk-supporting panel-like carriage or tray which has means for rollably mounting it on the inner tracks or rails 12 and 13. Said rollable means is preferably composed of 4 or more grooves rollers or grooved pulleys 21 which are journalled adjacent the four corner portions of the carriage by means of screws or pins 22 which are secured in the side edge portions of said carriage 20 as illustrated in FIG. 2.

A flexible cable 23 such as a cord or belt has one end connected to an end portion of tray 20 and extends about the end-most bar 14 and thence longitudially about the end-most crossbar 16, as illustrated at 24 in FIG. 1, and thence suitably connected to a hook or eyelet 23a at the intermediate portion of carriage or tray 20. As said cord or cable 23 is smooth and substantially taut, a person at either end of a table, on which the serving device is mounted, may pull on either the lower or upper run of the cable to move the carriage 20 to any position desired along said track rails 12 and 13 to position the food articles to desired reachable positions.

Numeral 25 generally designates an upper or elevated carriage or tray which includes a rigid panel 26 supported on four depending standards or legs 27 on the lower end portions of each of which is journalled a grooved pulley or grooved wheel 28 by means of suitable pins or screw 29 extending into the end portion of each such leg. The two legs 27 at each end portion of tray or carriage 25 are preferably integral and form angularly bent end portions of a continuous bar or rod as shown which is suitably secured by fasteners or staples 30 (FIG. 4) to the tray or carriage 25. Said legs 27 are of a length sufficient to support the panel 26 of carriage 25 at a substantial height to permit the lower tray 20 and food dishes thereon to roll under the panel 26 without interference.

As illustrated in FIG. 4, a rotatable tray or "lazy susan" 31, is preferably provided and supported on panel 26, the same preferably having a grooved annular track 32 and a flanged rotatable flat panel 33 supported on bearings 34 riding between said track 32 and the flange of said panel 33. A substantially upper panel 35 nonconductive of heat is removably mounted on said rotatable panel 33, and preferably has a central passage 36. A short stud or post 37 is secured on panel 33 of the turntable or lazy susan 31 and extends through the passage 36 and prevents side-wise or radial movement of panel 35, though allowing selective upward removal of said panel 35 for cleaning and storing purposes.

As illustrated in FIG. 4, an upper normally horizontal food supporting shelf 38 has a pair of spaced apart posts 39 secured in recesses in its middle portion and said posts 39 are either removably or securely mounted in spaced apart recesses formed in the central portion of panel 35. Said upper shelf provides additional areas and supports for food receptacles such as receptacle 40.

In FIGS. 5 and 6 there is illustrated a modified telescopic track rail construction capable of being collapsed or made substantially shorter and also adjustable to fit on tables of varying lengths or diameters. Numerals 41 designate two parallel outer metal pipes or tubes in each of which extensible and retractable rods 42 and 43 are slidably and telescopically mounted, said rods forming adjustable portions of the outer rails.

Set screws 44 are threaded in opposite ends of tubes 41 whose ends bear against end portions of rods 43 to secure said rods in desired extended or retracted positions.

Numerals 45 are two parallel metal tubes or pipes which are secured inwardly of tubes 41 by cross bars 46, which are welded both to said tubes 45 and tubes 41 at their points of intersection to hold said tubes in proper positions and provide a rectangular frame-like unit.

An inner pair of bars or rods 47 have one portion of each thereof telescopically slidable in each of the inner tubes or pipes 45, and are securable in desired positions relative thereto by set screws 44 threaded in said tubes 45 which releasably engage said rods to hold same in desired positions.

The bars or rods 47 and 42 at one end of the tubes 41 and 45 are preferably connected together by a pair of metal spaced apart cross bars 48 and 49, which are secured by welding or the like to said rods to hold same in perpendicular positions and in a frame-like member which can be either telescoped to maximum inward position relative to tubes 41 and 45 or may be fully removed for compactness and smaller size in packaging and storage.

The two pairs of rods 43 and 47 normally at the opposite ends of the device are connected by metal cross bars 50 and 51 which are secured thereto by welding or equivalent securance to provide a single frame-like unit selectively movable into telescoped positions or completely removable as a unit for compactnes in packaging and storage.

The normally outer end portions of rods 43, 42 and 47 are bent angularly to provide legs 52 on which rubber-like caps or pads 53 are preferably mounted as illustrated in FIG. 6.

It will be understood from the foregoing description that my invention provides a novel portable device, apparatus, conveyor or appliance for quickly and easily rollably moving a plurality of food serving containers or receptacles to various selected positions upon and along a table or other support, and which includes at least two separate movable trays or carriages at different heights, and independently movable to any position along their respective track means without interference with the second or other movable food supporting carriage or tray, this so that different persons in different positions may remove the desired foods simultaneously and move any of said food support members to other positions for access by other persons.

While the foregoing specification sets forth the invention in specific terms, it is to be understood that numerous changes in the shape, size and materials may be resorted to without departing from the spirit and scope of the invention as claimed hereinafter, and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a portable food serving device
   a pair of outside parallel track rails extending longitudinally;
   a plurality of transverse cross bars connecting said rails;
   a pair of inner track rails parrallel to and inward of said outside tracks and connected to said cross bars;
   a movable food-supporting tray;
   a plurality of rollers journalled along the side portions of said tray and adapted to roll on said inner track rails;
   a movable food-supporting carriage having depending legs and being in a place substantially higher than said tray;
   rollers journalled on the lower ends of said legs and adapted to roll along said outside track rails;
   said food tray being adapted to be rolled beneath said carriage to any position along said inner pair of track rails.

2. A food serving device substantially as recited in claim 1 and having a rotatable plate supporting member on the upper portion of said carriage, and having angular depending legs at the opposite ends of said cross bars.

3. A food serving device substantially as recited in claim 1 and having a flexible cable having its opposite ends connected to said movable tray and extending about the two endmost cross bars to facilitate manual selective movement of said tray.

4. A food serving device substantially as described in claim 1, wherein each of said outside track rails and each of said inner rails are composed of one or more tube sections and one or more metal rods, said rods being partially slidable into an aligned tube section to provide for reducing or adjusting the over-all length of said rails to facilitate transport, packaging and storage thereof;
   and screws threaded in said tube sections to removably secure said aligned rods in desired positions.

5. A food serving device substantially as recited in claim 2 and having a pair of spaced apart vertical posts mounted in the middle portion of said rotatable plate supporting member, and a food receptacle supporting shelf mounted on the upper ends of said posts.

6. A portable food serving device substantially as recited in claim 1, and having a rotatable lazy susan mounted on said carriage, and having a receptacle supporting panel removably mounted on said lazy susan to provide for selective positioning of food receptacles relative to different positions about a table on which said device is carried.

7. A portable food serving device having a pair of parallel spaced apart outer track rails and a pair of spaced apart inner track rails spaced inwardly of and within said outer rails;
   each of said track rails being composed of a plurality of extendable bars and a tube in which said bars are telescopically slidable;
   a tray rollable mounted on said inner track rails;
   a receptacle supporting carriage having depending legs;
   said legs having grooved roller members journalled on their lower ends which normally engage said outer rails respectively;

a food receptacle supporting plate-like member on said carriage; said carriage and said rollable tray being selectively movable along the full length of said track rails without interference with each other.

8. A food serving means having two pairs of supporting parallel guide tracks,
- a lower tray having rollers engaging one pair of said tracks;
- a carriage having leg supports and rollers thereon engaging another pair of said tracks, and normally in an upper plane above said tray and said carriage being movable along their respective tracks independently of each other and being adapted to support containers of food to be served from varying positions.

References Cited
UNITED STATES PATENTS

| | | | |
|---|---|---|---|
| 794,809 | 7/1905 | Marsh | 211—151 X |
| 1,748,843 | 2/1930 | Kuckel | 211—151 X |
| 1,946,532 | 2/1934 | Hatch | 211—151 X |
| 220,265 | 10/1879 | Wolfe | 211—151 |

NILE C. BYERS, Jr., Primary Examiner

U.S. Cl. X.R.

211—151